Patented May 1, 1928.

1,667,853

UNITED STATES PATENT OFFICE.

GERHARDT E. GRIMM, OF SPRINGFIELD, MASSACHUSETTS, ASSIGNOR TO WESTFIELD RIVER PAPER COMPANY, OF RUSSELL, MASSACHUSETTS, A CORPORATION OF MASSACHUSETTS.

PAPER BACKING AND PROCESS OF COATING THE SAME.

No Drawing.   Application filed January 14, 1925.  Serial No. 2,442.

This invention is an improvement in backings for rubber patch material, and processes of preparing the same for use.

Material of this character, intended for patching tires for motor vehicles, is of rubber, and it is usually prepared by flowing the rubber upon a backing of cloth, such for instance as closely woven canvas. The backing is necessary to support the rubber sheet and to prevent the layers of the rubber from adhering, the finished product being usually arranged in rolls.

When used a quantity of suitable area is detached from the cloth backing and from the remainder of the sheet, the cloth backing serving merely as a support for the rubber sheet prior to its utilization as a patch. The backing is relatively expensive and the cost of the patch material is greatly increased by its use.

An object of the present invention is the provision of a backing of an inexpensive nature, having a hard smooth finished surface to which the rubber will not adhere tightly and which is sufficiently strong to support the rubber and to separate the layers thereof.

With this and other objects in view, the invention consists in the backing, and in the process of preparing the same, as defined in the claims appended hereto; it being understood that various changes in the character and proportions of the several ingredients may be made, within the scope of the claims, without departing from the spirit of the invention.

For the backing of the present invention, I make use of a thin flexible relatively strong long fiber paper, and the paper is permeated with a solution, which waterproofs it, and at the same time provides it on both faces with a smooth glistening glaze forming a sufficiently strong support for the rubber from which however it is easily detached.

The solution used has for its essential ingredients, a hard resin, and a soft resin both soluble in alcohol, and applied in alcoholic solution, together with a drier, an oil, and an antiseptic. Lac, commonly known as shellac, is a suitable moisture proofing agent, and it is used in combination with colophony, or the rosin of commerce obtained in the distillation of turpentine. Suitable oils are castor, linseed, tung or China wood and soja bean.

The above named ingredients are combined about in the following proportions: Lac (shellac) 60 lbs., rosin 20 lbs., castor oil 3 gal., turpentine 1 gal., formaldehyde 1 qt., alcohol 30 gal. It is obvious however, that the proportions will vary in accordance with the quality of the paper used, and in accordance with other conditions.

The solution is prepared by dissolving the lac and the rosin in the alcohol, heat being used if necessary to facilitate solution. The other ingredients are then added. The solution is applied to both faces of the paper in any suitable manner, as for instance by passing a web of paper through a bath of a solution, the excess being removed in any suitable manner. Or the solution may be applied by means of rollers.

The patch material is prepared by flowing rubber onto one face of paper treated as above described. After coating the web is rolled compactly, reaching the consumer in this condition.

I claim:

1. A backing for sheet rubber, consisting of paper having a smooth even uniform coating of a hard resin, a soft resin and a vegetable oil.

2. A backing for sheet rubber, consisting of paper having a smooth even uniform coating of a hard resin, a soft resin, castor oil and a drier.

3. A backing for sheet rubber, consisting of paper having a smooth even uniform coating of lac, resin, and castor oil, in substantially the proportions set forth.

4. The process of preparing paper backing for rubber patch material, which comprises coating the paper with an alcoholic solution of a hard resin and a soft resin, in an alcoholic solution containing a vegetable oil, a drier, and a sterilizing agent.

5. The process of preparing rubber patch material, which comprises treating the paper with an alcoholic solution of lac and rosin, containing castor oil, turpentine and formaldehyde, in substantially the proportions set forth.

6. The process of preparing rubber patch material, which comprises treating the paper with lac, rosin, castor oil, turpentine, formaldehyde and alcohol in substantially the following proportions, lac 60 lbs., rosin 30 lbs., castor oil 3 gal., turpentine 1 gal., alcohol 30 gal.

7. As an article of manufacture, a relatively thick film of soft rubber adapted for use as a patch material on a flexible backing of paper having on the face adjacent to the rubber film a smooth, even, uniform coating, of a hard resin and a soft resin non-adhesive at normal temperatures, whereby the rubber may be readily stripped from the paper.

8. As an article of manufacture, a relatively thick film of soft rubber adapted for use as a patch material on a flexible backing of paper having on a face adjacent to the film a smooth, even, uniform coating of lac and rosin.

Signed at New York, in the county of New York and State of New York, this 9th day of January A. D. 1925.

GERHARDT E. GRIMM.